US008008225B2

(12) United States Patent
Henze et al.

(10) Patent No.: US 8,008,225 B2
(45) Date of Patent: Aug. 30, 2011

(54) THERMOCATALYTICALLY ACTIVE COATING, SUBSTRATE HAVING THE THERMOCATALYTICALLY ACTIVE COATING AT LEAST IN PARTS, AND PROCESS FOR PRODUCING SAME

(75) Inventors: Inka Henze, Nieder-Olm (DE); Hrabanus Hack, Mainz (DE); Gerhard Weber, Bechenheim (DE); Hans-Joachim Schmitt, Ockenheim (DE); Wolfgang Schmidbauer, Mainz (DE); Torsten Gabelmann, Wiesbaden (DE)

(73) Assignee: SCHOTT AG, Mainz (DE)

( * ) Notice: Subject to any disclaimer, the term of this patent is extended or adjusted under 35 U.S.C. 154(b) by 56 days.

(21) Appl. No.: 12/545,249

(22) Filed: Aug. 21, 2009

(65) Prior Publication Data

US 2010/0056362 A1 Mar. 4, 2010

(30) Foreign Application Priority Data

Aug. 26, 2008 (DE) ......................... 10 2008 039 684

(51) Int. Cl.
*B01J 23/04* (2006.01)

(52) U.S. Cl. ............ 502/159; 423/395; 423/517; 422/4; 422/5; 422/120; 422/122; 428/450; 428/457

(58) Field of Classification Search .................. 502/159; 422/5, 120; 252/454
See application file for complete search history.

(56) References Cited

U.S. PATENT DOCUMENTS

| | | | | |
|---|---|---|---|---|
| 3,460,523 | A * | 8/1969 | Yates et al. | 126/19 R |
| 3,547,098 | A | 12/1970 | Lee | |
| 3,993,597 | A * | 11/1976 | Stiles | 502/2 |
| 4,147,835 | A * | 4/1979 | Nishino et al. | 428/450 |
| 4,471,027 | A * | 9/1984 | Maki et al. | 428/450 |
| 4,515,758 | A | 5/1985 | Domesle et al. | |
| 4,515,862 | A * | 5/1985 | Maki et al. | 428/450 |
| 4,588,707 | A | 5/1986 | Domesle et al. | |
| 5,387,475 | A | 2/1995 | Baresel et al. | |
| 6,656,425 | B1 * | 12/2003 | Benthien et al. | 422/5 |
| 7,037,596 | B1 * | 5/2006 | Benthien et al. | 428/632 |
| 7,297,656 | B2 | 11/2007 | Zhang et al. | |
| 2005/0006436 | A1 | 1/2005 | Jordens et al. | |
| 2005/0031513 | A1 | 2/2005 | McNamara et al. | |

FOREIGN PATENT DOCUMENTS

| | | |
|---|---|---|
| DE | 1 914 548 | 10/1969 |
| DE | 1 794 024 | 10/1971 |
| DE | 25 17 526 | 12/1975 |
| DE | 29 41 768 | 7/1980 |
| DE | 39 42 236 | 6/1991 |
| DE | 199 15 378 | 10/2000 |
| DE | 101 50 825 | 4/2003 |
| EP | 0 105 113 | 4/1984 |
| EP | 0 645 173 | 3/1995 |
| EP | 1 165 153 | 1/2002 |
| EP | 1 412 060 | 4/2004 |
| WO | 10 2006 056 088 | 5/2008 |
| WO | 2008/122266 | 10/2008 |
| WO | WO2008122266 | * 10/2008 |

* cited by examiner

*Primary Examiner* — Melvin C Mayes
*Assistant Examiner* — Colette Nguyen
(74) *Attorney, Agent, or Firm* — Michael J. Striker

(57) ABSTRACT

A substrate, such as a glass, glass ceramic, ceramic or metal substrate, is provided with a thermocatalytically active coating on at least a part of the substrate surface. The thermocatalytic coating contains an inorganic lithium salt or organic lithium-containing compound in an amount that is equivalent to not less than 2 wt. % of lithium ions, based on total coating weight. The thermocatalytic coating has a glass, glass solder or sol-gel matrix in which the lithium salt or organic lithium-containing compound is introduced. Optional barrier and IR-reflecting layers are arranged between the substrate surface and the thermocatalytically active coating.

24 Claims, No Drawings

THERMOCATALYTICALLY ACTIVE COATING, SUBSTRATE HAVING THE THERMOCATALYTICALLY ACTIVE COATING AT LEAST IN PARTS, AND PROCESS FOR PRODUCING SAME

CROSS-REFERENCE

The invention described and claimed herein below is also described in German Patent Application 10 2008 039 684.2, which was filed on Aug. 26, 2008 in Germany. The aforesaid German Patent Application provides the basis for a claim of priority of invention for the invention claimed herein below under 35 U.S.C. 119 (a) to (d).

BACKGROUND OF THE INVENTION

1. The Field of the Invention

The present invention relates to a thermocatalytically active coating, a substrate which has a thermocatalytically active coating at least in parts, and also a process for producing a thermocatalytically active substrate surface and use thereof.

2. The Related Art

Thermocatalytic layers and surfaces are generally known and are used for car exhaust cleaning and for supporting self-cleaning in baking ovens. Generally, such coatings are noble metal coatings, such as platinum, or enamel coatings which contain transition metals. Baking ovens comprise a closable cooking space which is delimited by a baking oven muffle. In use, the side walls of this cooking space and also the inspection glass are frequently fouled, for example by fat splashes and roasting juices. Since this fouling is usually unavoidable, various attempts have already been undertaken to facilitate cleaning the cooking space. Generally, a differentiation is made here between catalytic and pyrolytic cleaning.

In pyrolytic cleaning of baking ovens, heating elements provided as extra therefore are activated, which elements ensure that the fouling is completely burnt off in about 2 h at temperatures of 500° C. This pyrolytic cleaning is complex because of the high temperatures which must be used and expensive owing to the constantly increasing energy costs.

Cleaning inspection glasses of combustion chambers, such as flue stoves, for example, is similarly complex to arrange. Here also cleaning the inspection glasses is currently only achievable using pyrolytic methods. However, since the manufacturers of flue stoves seek to avoid high temperatures at the inspection glasses for reasons of efficiency and safety, generally the temperature of 500° C. which is required for a pyrolytic cleaning is not reached at all or at least not over the entire surface.

In the case of catalytic cleaning, the decomposition and oxidation and/or the combustion of fouling and gaseous exhaust gases proceed by the aid of catalytic and/or oxidizing agents even at low temperatures, i.e. temperatures significantly below 500° C. Therefore, seen from the cost aspect, catalytic systems are preferred over the pyrolytic systems. In the case of catalytic cleaning systems, the surface to be cleaned is generally provided with a catalytically active coating.

Catalytic layers in baking ovens are known as coatings of the baking oven muffle. In DE 101 50 825 A1 a high-porosity coating is described which consists of porous particles and a binder matrix. The object of this thick coating is to spread out and absorb the fats in the layer. The catalytic decomposition proceeds in the presence of transition metal particles and can start even at temperatures <300° C. These prior art coatings are not transparent. For this reason, to date the baking oven inspection glass has not been coated with self-cleaning catalytically active coatings, and thus the baking oven glass still had to be cleaned with abrasive agents or other chemical cleaners.

U.S. Pat. No. 7,297,656 B2 describes catalytic layers which degrade diesel soot. The coating consists of doped platinates. In the description, dopings of platinates with lithium are described in which the start temperature of the catalytic reaction of platinum is lowered from 392° C. to 366° C. In this patent the presence of platinum is essential. It is not obvious to a person skilled in the art that layers having lithium without platinum could exhibit outstanding activity.

EP 0 645 173 B1 also describes a catalyst of a combination of lithium and platinum or palladium. The lithium is intended to prevent poisoning reactions of the platinum or palladium. Lithium is produced in an $Al_2O_3$ support in a composite as strong as possible onto which the catalyst platinum or palladium and also other metal ions are then applied. This type of catalyst is used for exhaust gas purification. Here also it is not clear to a person skilled in the art that lithium without platinum or the remaining composite of the described support materials will be active.

Alkali metals, preferably potassium, are described in EP 1 412 060 B1 in use in spark-ignition internal combustion engines. Here, support materials are impregnated with aqueous potassium solutions. In this patent there is no assumption that transparent products will become possible. Also, in the description it is stated that the catalytic action is obtained primarily from the redox potential of the support materials, with the effect being yet further improved by the alkali metals and here, primarily, potassium. Lithium as sole active component is not described.

A further filter for diesel soot may be found in EP 0 105 113 B1. In the patent, as an exemplary embodiment an aqueous LiOH solution is poured over a filter. The ignition temperature is 467° C. On account of the high ignition temperature disclosed in the patent publication, it cannot be assumed that the composition selected can be utilized for the present invention. In addition, LiOH is highly alkaline and aggressive and corrosively attacks most substrate materials such as, e.g., glass, glass ceramic, metal and some plastics.

Catalytic layers are also used for deodorization.

EP 1 165 153 B1 describes silicate layers, the catalytic activity of which is achieved by adding transition metal particles. Optionally, in the description, the addition of glass-forming elements is described among which, inter alia, lithium is also mentioned. Since lithium is known as a glass-forming element and lithium-containing glasses without an appropriately finished surface do not have catalytic activity, it is not obvious that the lithium here is catalytically active.

The use of noble metals is cost-intensive and frequently has the disadvantage, as do the coatings of transition metal compounds, that the layers have an inherent color. In addition, materials having very high surface areas are frequently required in order to obtain a sufficient degradation reaction rate.

There is therefore a need for more durable and longer-life, transparent surfaces capable of self-cleaning. These are advantageous, especially, in combustion chambers, such as, for example, flue stoves, or else in cooking, roasting, baking and grilling devices, and also in components for flue gas purification, such as, for example, odor-reducing components.

SUMMARY OF THE INVENTION

It is therefore an object of the invention to provide a thermocatalytic coating which, even at low temperatures, preferably <350° C., exhibits a sufficient degradation rate and not only is thin but also does not have an inherent color.

In addition, it is an object of the invention to use only Li precursors for the coating which behave in a neutral manner toward the substrate and do not attack the surfaces corrosively, that is have a pH≦11.

It is a further object of the invention to provide a substrate which has at least in part a thermocatalytically active surface on which catalytic combustion of soot and other organic or oxidizable compounds can be achieved at significantly lower temperatures than is possible with previously known substrates.

It is a further object of the invention to describe a process for producing such a substrate having a thermocatalytic coating.

It has surprisingly been found that by using a coating which comprises at least one lithium compound, the temperature at which a catalytic organic decomposition reaction such as, for example, soot combustion on the thermocatalytic coating, or at which the self-cleaning property of food fouling, i.e. of hydrogen compounds, such as carbohydrates, proteins, fats etc., proceeds, can be significantly reduced. Surprisingly, catalytic activity of the lithium compound has been demonstrated in the oxidation of carbon monoxide in the flue gas stream.

According to the invention the aforesaid objects are attained by a coating according to the invention that contains at least one lithium compound in an amount which is equivalent to ≧2% by weight of lithium ions, based on the total weight of the coating.

The object is further achieved by a process for producing a coated substrate by providing a coating composition, applying the coating composition to a substrate and drying the coated substrate.

The expression "lithium compound" as used here includes all ionic compounds having a pH≦11 (when dissolved in water), which comprise at least one lithium ion. These include, in addition to the known inorganic lithium salts such as, for example, lithium phosphate, lithium nitrate, lithium halides and lithium sulfate, also organic lithium-containing compounds, such as, for example, lithium acetate, lithium citrate tetrahydrate, lithium propionate and lithium derivatives of carboxylic acids, and also mixed oxides which contain lithium, and all lithium-ion-containing compounds, which are formed, for example, in a thermal decomposition of organyl lithium compounds or due to the reactive conversion of metallic lithium.

Apart from unavoidable impurities, as occur, for example, in the raw materials used or form as a result of the preparation, the coating is preferably free of $Li_2O$ and/or LiOH. In a moist atmosphere, $Li_2O$ is converted readily to LiOH, which gives rise to a very alkaline surface, which can in turn attack the substrate. Typically, $Li_2O$ therefore has to be kept in a clean and dry atmosphere.

According to the invention, the pH is based on the values reported in safety data sheets from Merck Chemicals (from Merck KGaA, Darmstadt, Germany), and is generally based on 50 g/l of water at 20° C. At excessively low solubilities of the substances, the pH values are, however, also reported for smaller amounts, for example 5 g/l of water, or higher temperatures.

The lithium compound is essentially the thermocatalytically active part of the coating.

"Thermocatalysis" or "thermocatalytic" means here that the activation energy of a reaction is lowered by means of the inventive shaped body such that the reaction temperature is lowered.

The lithium compound may, however, also be an amorphous inorganic and/or a crystalline inorganic compound, especially a single-component and/or multicomponent compound of the oxides and/or nitrides and/or carbides and/or fluorides of Si, B, Ge, Bi, Al, Na, Li, K, P, Mg, Ca, Sr, Ba, Mn, Ni, Co, Cr, V, Sn, Zn, In, Fe, Ti, Zr, Hf, Y, Nb, Ce, Gd, La, Sm, Ta, W.

It will be appreciated that the coating may comprise impurity and dopant components of the elements such as C, Si, B, Ge, Bi, Al, Na, K, P, Mg, Ca, Sr, Ba, Mn, Ni, Co, Cr, V, Sn, Zn, in, Fe, Ti, Zr, Hf, Y, Nb, Ce, Gd, La, Sm, Ta, W or of noble metals, such as Pt, Rh, Pd, Ru, Au, Ag. Dopant components are preferably added in orders of magnitude of less than 2% by weight.

The lithium compound can according to the invention be present both without a binding matrix and also bound in a matrix. Thus it is possible to dissolve lithium compounds and apply them to a substrate. In the context of the invention, all conventional solvents can be used such as, for example, water, alcohols, ketones, acetones, acetyl acetonate, ethyl acetate, polyhydric alcohols, and also mixtures thereof.

In a preferred embodiment the coating is made from a lithium compound according to the invention and a binding matrix. The binding matrix can comprise both an inorganic matrix and also an organic matrix, or mixtures thereof.

The term "inorganic matrix" means the following substances: glasses and glass solders, sol-gel matrices. Preferably, these inorganic matrices contain silicon oxide, titanium oxide, zirconium oxide, aluminium oxide, cerium oxide, iron oxide, tin oxide, boron oxide. The matrix can according to the invention also consist of a mixture of said matrix components.

According to the invention an inorganic sol-gel matrix is preferred. The production of such sol-gel systems is known to those skilled in the art. According to the invention, preference is given to those sol-gel layers which develop a thin transparent gel film or gel layer after drying or heat treatment.

The sol-gel matrix is produced by acid- or base-catalyzed hydrolysis in water, an organic solvent or an aqueous/organic solvent mixture such as, for example, a mixture of water and at least one solvent selected from the group of alcohols, polyhydric alcohols, acetones, ketones, acetyl acetonate, ethyl acetate, 2-butoxy-ethanol, 1-propanol, 2-propanol, methanol, ethanol and further solvents which are known to those skilled in the art. These sols are clear stable solutions having solids content generally in the range of about 1 to about 40% by weight. The resultant sol-gel layers preferably consist of a network of semimetal or metal oxides such as, for example, silicon oxide, germanium oxide, titanium oxide, zirconium oxide, aluminum oxide, cerium oxide, boron oxide, iron oxide, tin oxide or mixtures thereof.

An organic matrix in the context of the invention is taken to mean an organically based compound which can be made up of waxes, polymers, surfactants, carboxylic acids and fatty acids, oils, resins, silicone resins, or mixtures thereof. This has the purpose of fixing the lithium compound to the substrate. According to the invention, polymers are taken to mean carbonaceous macromolecules. Preference is given to silicones and silicone resins, and also polymers decomposing thermally residue-free such as, for example, poly(vinyl alcohol), polyvinylpyrrolidone, poly(ethylene glycol) or cellulose.

In a further embodiment of the invention preference is given to a mixture which contains at least one thickener, preferably selected from the group consisting of xanthan gum, glycerol, poly(ethylene glycol), poly(vinyl alcohol), polyvinylpyrrolidone, and also cellulose and the cellulose derivatives and mixtures thereof.

It has been found that the above-mentioned thickeners are particularly effective for producing pastes used to make the thermocatalytic coating.

These substances have the advantage that they are easy to handle by the end user and may be simply rubbed onto the substrate surface using conventional cloths. The thickeners are non-toxic and decompose in use so as to be residue-free.

Of course, the above-mentioned features and features still to be described herein below can be used not only in the combination stated in each case, but also in other combinations or alone without departing from the context of the present invention.

The viscosity of the coating covers the liquid to pasty range, i.e. a viscosity of from 0.5 mPa·s to $10^6$ mPa·s. The desired viscosities can be achieved by suitable selection of the solvent, thickener or the matrix and by addition of particles or insoluble components. Particular preference here is given to particles having particle sizes of from 2 to 200 nm. In addition to the possibility of using the particles for thickening the coating solution, it is equally possible to add to the coating solution particles having functional properties such as reflecting properties, e.g. in the infrared or ultraviolet range, at defined wavelengths, or coloring properties, or biocidal properties or particles further reinforcing the thermocatalysis.

According to the invention the thermocatalytic reaction takes place at temperatures of 100° C. to 600° C., preferably at 200° C. to 400° C., particularly preferably at 300° C. to 350° C.

In order to make possible improved use of thermocatalytically self-cleaning surfaces, a substrate is required which has a surface on which a catalytic decomposition proceeds even at low temperatures. In addition, the surface must be designed such that cyclic heating does not lead to damage of the substrate.

The thermocatalytically active surface according to the Invention can in this case be present on the entire surface of the substrate or on parts thereof and as a continuous layer or in the form of small distributed agglomerations. It is understandable here to those skilled in the art that, in the case of the presence of non-continuous layers, the lithium concentration must only be achieved at points.

The substrate according to the invention can consist of a variety of materials, wherein the material should have a thermal resistance of 350° C. As substrate, it is possible, for example, to select all glass ceramics such as CERAN®, ROBAX®, ZERODUR®, special glasses, such as Borofloat®, DURAN®, FIOLAX® and other glasses, ceramics, metals and selected high-temperature plastics. Obviously, the substrate can also have modified surfaces, such as, for example, enamel, decorations, heat-reflecting layers, antireflecting surfaces, porous substrates, such as sintered glass and sintered glass ceramic layers, adhesion promoter layers and barrier layers. These can be applied in this case at least in parts on one or both sides, if appropriate also in a multilayer manner. Obviously, any desired colors, images and structures can also be present on the part to be coated.

The substrate can in addition have various shapes. It can be, e.g., in the form of flat or three-dimensionally shaped plates, porous filters, fibers, shaped articles or else in particulate form, e.g. in powder form. The coated component or the article is not subject to any restrictions not only with respect to the material, but also with respect to the shape in the context of the invention, and so flat, round, rounded, large and small shapes can be used.

The surfaces according to the invention can have porous or non-porous structures. In the case of porous surfaces, the porosity is in the range of 2-70%, preferably 5-50%.

The lithium-containing surface can be an integral component of the substrate or be present in the form of a coating on the substrate. The lithium compounds can be present as simple salts, or else in the form of mixed salts. The lithium compounds can be present simply as crystalline or amorphous layers or particles, or else enclosed in matrices or in other systems such as, e.g., zeolites. In this case it is only necessary to ensure that a part of the lithium compounds is accessible on the surface. If the thermocatalytically active surface is present as a coating, this coating can be applied directly to the substrate, or other possibly functional layers such as, e.g., IR radiation-reflecting layers, adhesion promoter layers or barrier layers which prevent or at least retard the diffusion of lithium into the substrate can be present between substrate and surface.

The thermocatalytically active surfaces according to the invention can be formed directly during the production of the substrate or can be applied to the substrate by processes known to those skilled in the art. Exemplary processes include liquid coating processes such as spraying, flooding, pouring and immersion processes, and also roller coating and screen printing using solutions of lithium compounds, CVD and PVD processes. A further possibility for producing the substrates according to the invention is to make lithium compounds or lithium ions present in the substrate material accessible by a surface treatment such as, for example, etching processes.

In a further embodiment, lithium compounds, without incorporation into a matrix, are bound to the substrate, preferably by a heat treatment. Some of the above-mentioned lithium compounds can be melted. At relatively high temperatures, i.e. >300° C., an ion exchange can proceed between the substrate and lithium. Preference is given here to ion-exchange reactions on glasses, sintered glasses and ceramics, in which, for example, hydrogen ions from the substrate are exchanged for lithium ions. The ion exchange can proceed in this case during the process of producing the glasses, such as, for example, in the float process or during glass forming, or in a downstream heat process. Preference is given in this case to the tempering process, since in this manner an additional process step is not necessary and the energy required is used efficiently. Less preference is given to ion exchange in the case of glass ceramics as described in DE 10 2006 056 088 A1, since the exchanged lithium ions are incorporated into the crystal phase of the glass ceramic in the ceramization process and may no longer be sufficiently available for catalytic reactions.

In a preferred process the surface is generated by applying the lithium compound in the form of a paste. A paste in this case has the advantage that it is particularly easy to handle and if required can even be applied to a desired substrate by an end user in the home, e.g. in order to clean an already fouled substrate, in order to furnish a substrate with a thermocatalytic functionality or in order to refresh pre-existing thermocatalytic functionality.

In a further preferred embodiment, the coating proceeds in the form of a sol-gel process. The advantage of a sol-gel process is that a preferably very porous and therefore catalytically very active system can be produced therewith. Other possible coating forms include PVD and CVD processes.

A substrate in which the thermocatalytically active surface is present in the form of a coating can be produced, e.g., by applying a coating composition or solution to the substrate and subsequently drying it or if required applying further treatments. The drying temperatures in this case are 20° C. to 750° C., preferably 20° C. to 500° C., and particularly preferably 20° C. to 450° C. Such a substrate can be prepared by this means in a simple manner.

In a further embodiment of the above-mentioned features the coating has a thickness of from 1 nm to 10 μm, preferably from 5 nm to 350 nm, and particularly preferably from 10 nm to 300 or 200 nm.

By the use of coatings of this thickness a long-term stable coating for the substrate having thermocatalytic activity is created without disproportionately thick layers needing to be applied which would impair other properties, for example the aesthetic properties, of the substrate.

In a further embodiment with the above-mentioned features a barrier layer is arranged between the substrate and the coating.

By the provision of this barrier layer, a diffusion of lithium ions from the thermocatalytically active surface into the substrate can be prevented. In this manner the content of lithium ions and thereby the thermocatalytic activity of the thermocatalytically active surface can be retained over a long time. In addition, as a result, damage to the substrate by gases can also be prevented, which gases are released during the catalytic decomposition. Examples include, e.g., sulfur-containing gases which can impair the stability of a glass substrate.

Examples of this barrier layer include layers of $SiO_2$, $SnO_2$, $Al_2O_3$, $ZrO_2$ and $TiO_2$, or mixtures thereof.

In a further embodiment of the invention, the substrate and the surface are transparent. Preferably, the substrate and the surface are colorless.

In this manner, transparent colorless inspection glasses can be produced using the substrate according to the invention, which inspection glasses, even under the influence of the heat occurring, for example, in a combustion chamber, are self-cleaning and therefore reliably permit a view over a long time.

The expression "combustion chamber" in the context of the present invention comprises any chamber in which combustion of oxidizable substances, for example carbonaceous, hydrocarbon or nitrogenous substances, proceeds. These chambers include combustion chambers of internal combustion engines, industrially utilized combustion chambers, and also, e.g., open or closed flues or flue stoves in private households. The expression "combustion chamber", however, also includes other chambers in which carbonaceous or hydrocarbon substances are exposed to an elevated temperature, such as, e.g., cooking, roasting and grilling cookware or baking ovens.

In a further embodiment of the invention the combustion chamber has an inspection glass which has the substrate according to the invention, wherein the thermocatalytically active surface is arranged on the side of the inspection glass facing the combustion chamber.

The use of the coated substrate according to the invention as inspection glass for a combustion chamber in a manner such that the surface is arranged on the side facing the combustion chamber can effectively prevent fouling of the inspection glass which makes frequent cleaning of the inspection glass unnecessary and enables long-term secure view into the combustion chamber.

In a further embodiment of the invention, in addition, an IR radiation-reflecting layer is arranged on the substrate.

The IR radiation-reflecting layer can in this case be arranged either beneath the thermocatalytically active surface or, in the event that the substrate is transparent to IR radiation it can also be arranged on a side of the substrate facing away from the surface. By providing such a layer, the IR radiation penetrating through a thermocatalytically active surface is reflected at the layer reflecting the IR radiation and again passes through the thermocatalytically active surface. The temperature of the thermocatalytically active surface is increased thereby, which further significantly improves the thermocatalytic decomposition activity.

Examples of materials for the IR radiation-reflecting layer include $SnO_2$ and indium-tin oxide, aluminum-zinc oxide and noble metal layers.

In a further embodiment of the invention, the combustion chamber has a flue gas outlet, wherein the substrate according to the invention is arranged in the region of the flue gas outlet.

Such a flue gas outlet can be, for example, a chimney or baking oven, or else an exhaust of an internal combustion engine. The substrate according to the invention in this case can be arranged in the combustion chamber itself or at an interface between combustion chamber and flue gas outlet, or in the flue gas outlet.

By arranging the substrate according to the invention in the region of the flue gas outlet, for example the amount of soot, fine dust and gases such as, for example, nitrogen oxides, carbon monoxide, sulfur gases, which are released into the environment from the combustion chamber, can be significantly reduced, which significantly increases the environmental friendliness of such a combustion chamber.

By the use of a substrate according to the invention in a process for the catalytic burning of soot, the temperatures at which a catalytic soot combustion proceeds can be significantly reduced, so that this process, e.g., already proceeds at a temperature as customarily prevails in a combustion chamber according to the invention, and so additional heating for soot combustion is no longer necessary.

"Soot", in the context of the present invention, is taken to mean any particulate agglomeration of material, which is predominantly carbonaceous. This includes not only products which are formed in incomplete combustion of carbonaceous or hydrocarbon substances, but also further carbonaceous agglomerations which are formed, e.g., by a thermal treatment of hydrocarbons. It is clear in this case to those skilled in the art that soot, in addition to carbon, can also contain other components such as, e.g., unburnt hydrocarbons, sulfur compounds, nitrogen compounds, or metals and metal compounds.

The term "soot", in this connection, is also taken to mean carbonized food residues, i.e. food residues of a substance or of a substance mixture which at the operating temperatures of the cooking, roasting, baking and grilling devices firmly adheres to the surface and may penetrate, at least in part, into the matrix of the self-cleaning coating or the pores possibly present therein. These can be oils, which are liquid or greasy at the operating temperatures, aqueous phases (salt and sugar solutions) and also carbohydrates and proteins mixed with these. In particular, the impurities are oils, such as, for example, sunflower oil, soya oil, vegetable fat, olive oil, and tomato sauce, cheese, fruit juices and milk.

The coatings, surfaces and substrates according to the invention can be used in the following applications:

components in or on chimneys and flue stoves, preferably flue inspection glasses, chimney interior liners, lining of the chimney fluepipe, filters for chimneys;

components in or on heating systems, preferably heating system interior linings, lining the flue pipe, filters for fluepipe;

components in or on cooking, roasting, baking and grilling devices, preferably cooking surfaces, inspection glasses, interior linings, lining the exhaust pipe, filters for exhaust pipe, deep-fat fryers, microwaves, baking sheets, baking moulds, mesh baking grids, grilling spits, industrial automated baking machines, etc., particularly preferably components in or on pyrolysis furnaces;

components on steam extractor hoods, preferably filter materials;

components on solar systems, preferably receiver tubes;

components on reactors, preferably inspection windows, filter systems; and components on or in combustion systems, such as refuse incineration plants, crematoria;

components on or in internal combustion engines, such as diesel soot filters, automotive catalytic converters, various exhaust gas filters.

The invention will be described in more detail hereinafter with reference to exemplary embodiments.

EXEMPLARY EMBODIMENTS

Example 1

A coating solution is produced as follows. 16.6 g of lithium acetate.$2H_2O$, 100 ml of ethanol, 20 g of acetyl acetonate, 38 g of zirconium propylate and 50 ml of ethyl acetate are mixed and ethanol is added to the resulting mixture until it has a volume of 250 ml.

Cleaned glass discs are coated with the solution in an immersion process. The coating proceeds at a drawing velocity of 40 cm/min. Subsequently the layers are dried at 450° C. for 1 h. The glass receives an abrasion-resistant, long-term stable, transparent coating.

Example 2

A coating solution is produced as follows. 10 g of $HNO_3$ 1N, 20 g of ethanol, 40 ml of lithium nitrate (10% in ethanol), 40 ml of lithium chloride (10% in ethanol) and 50 g of $SiO_x$ nanoparticles are mixed and ethanol is added until the resulting mixture has a volume of 250 ml.

In a spraying process, cleaned glass ceramic plates are coated with the solution. The resultant coating is translucent.

Example 3

A coating is produced as follows:

16.6 g of tetraethoxysiloxane are added into the initially charged 40 g of ethanol and subsequently, with stirring, 12 ml of hydrochloric acid (1% strength) are added dropwise. After 10 min, with further stirring, 7 g of lithium chloride are introduced. Ethanol is added to the resulting mixture until it reaches 250 ml.

A cleaned glass substrate is immersed at a drawing velocity of 20 cm/min. The resultant layer is burnt in at 650° C. for some minutes in the tempering process.

Example 4

In addition to liquids, active surfaces can also be obtained by the rubbing of pastes. These coatings are defined for use in the home. The end user can use these pastes for producing or refreshing a thermocatalytic surface.

For production of the paste, 25 g of glycerol, 25 g of lithium hydroxystearate (5% in $H_2O$), 12.5 g of lithium chloride (25% in $H_2O$) and 12.5 g of lithium sulfate (25% in $H_2O$) are stirred with a blade mixer. Subsequently this paste is rubbed onto a metal plate thinly using a cloth until it is no longer visible.

Example 5

The coating solution is produced in a plurality of steps.

A) First, for producing coating solutions with which coatings according to the invention can be produced, an amorphous zirconium oxide precursor powder is produced. For this, e.g., to 424.9 g of zirconium(IV) propylate solution (77%) are added, dropwise, with stirring, 100.1 g of acetyl acetone in the course of about 25 minutes, with significant heating occurring. The lemon-yellow solution is stirred for 45 min at room temperature and subsequently hydrolyzed with 54.1 g of water. The solvent and also other volatile components are removed in a vacuum at 80° C. and 40 mbar. This produces a fine yellow precursor powder no. 1 having an oxide content of 51% by weight.

Subsequently a 12% by weight aqueous solution is produced using this precursor powder, which solution is called stock solution no. 1.

This stock solution no. 1 is subsequently treated for 24 h at 165° C. in an autoclave. This produces stock solution no. 2 having colloidally dispersed 5-20 nm size $ZrO_2$ nanocrystalline particles (monoclinic and tetragonal phase).

B) 23.5 g of $ZrO_2$ precursor powder (stock solution No. 1) are dissolved with 20 g of lithium acetate.$2H_2O$ in 363 g of ethanol.

A purified low-E glass disc is immersion-coated at a drawing velocity of 20 cm/min and solidified at a firing-on temperature of 450° C.

Example 6

The coating solution is produced in a plurality of steps.

10.5 g of $ZrO_2$ precursor powder (stock solution No. 1 from Example 5A) are dissolved in 150 g of ethanol together with 45 g of $ZrO_2$ stock solution no. 2 (Example 5A) and 8.3 g of lithium chloride.

At a drawing velocity of 30 cm/min in the immersion coating process and a firing-on temperature of 350° C., transparent nanocrystalline layers according to the invention can be produced.

Example 7

The coating solution described in example 1 is applied to a highly porous substrate. The substrate is generated during the ceramizing process. In this case green glass powder is applied to a green glass substrate by screen printing. Subsequently the porous layer, in the ceramizing process, is converted and sintered. The resultant surface is highly porous, white and very scratch resistant.

The substrate is immersed in the solution described in example 1 and dried. The surface, even after coating with the solution, is still pure white.

Example 8

The coating solution described in example 1 was mixed with 30% by weight of particles.

The particles were prepared by first preparing two solutions. For this purpose, 20.4 g of lithium acetate*$2H_2O$ were mixed in 20 g of acetic acid and 100 g of ethanol (solution A). For the second solution, 49.2 g of aluminium sec-butoxide were mixed in 50 g of isopropanol (solution B). Subsequently, solution A was added to solution B with stirring and made up to 250 ml with ethanol. After 2 h, the material gelated out to form a white gel and was subsequently dried in three steps at 100° C. for 16 h, at 400° C. for 3 h and at 700° C. for 3 h. The gel was comminuted with a mortar, so as to form fine particles.

The coating solution was applied to a porous ceramic substrate, as typically used for exhaust gas treatment, dried and fired at 600° C. for 2 h.

Comparative Example 1

A coating solution is produced as follows. First 50 g of 1N $HNO_3$, 40 g of ethanol, 9 g of tetramethyl orthosilicate and 60 g of nanoparticles are mixed, made up to 1 l with ethanol and homogenized with stirring. Subsequently 10.6 g of cobalt nitrate ($Co(NO_3)_2.6H_2O$) are stirred into 500 ml of the described solution with stirring.

The coating is applied to glass ceramic samples in the immersion process and fired on at 450° C.

Comparative Example 2

A coating solution is produced as follows. 13.2 g of nickel chloride-$6H_2O$ are dissolved in 70 g of ethanol. Subsequently, 20.8 g of tetramethyl orthosilicate, 1 g of HCl and 50 g of ethanol are added to the solution with stirring, and the mixture is made up to 250 ml with ethanol.

The coating is applied to glass ceramic samples in the immersion process and fired on at 450° C.

Test

The different coatings are examined visually and their transparency is assessed qualitatively. The catalytic activity can be evaluated using soot or oil.

To evaluate soot degradation, differing foulings are deposited on the coatings. Either the coated substrates are covered with candle soot or a soot dispersion or a mixture of soot and rosin is sprayed onto the substrate. To prepare the soot dispersion, a 10% strength soot dispersion is produced from Degussa Printex U and ethanol. The mixture of soot and rosin is produced from 10% strength soot dispersion, as described above, and a 10% strength rosin solution in ethanol, in a ratio of 1:1.

After the fouling is dried, the samples are subsequently brought to and maintained at temperatures of 100 to 550° C. Preferably, in the test, a stepwise elevation of temperature by 50° C. in the range 300-550° C. with a holding time of 1 h is used. After each temperature stressing and cooling of the sample, it is assessed visually. Transparent substrates are additionally characterized in a haze meter and photographically documented.

Complete soot degradation occurs on uncoated glass discs at 550° C. (Table 1). This is pyrolytic decomposition of the organic components. All of the surfaces listed in the examples exhibit significantly better and earlier decomposition of the soot compared with the uncoated reference and comparative examples using transition metals.

TABLE 1

CHARACTERISTICS OF THE COATINGS—SOOT DEGRADATION

| | | Catalytic activity (T/1 h) | | | | | |
|---|---|---|---|---|---|---|---|
| Substance | Transparency | 300° C. | 350° C. | 400° C. | 450° C. | 500° C. | 550° C. |
| Reference glass ceramic | | — | — | — | 0 | ++ | +++ |
| Example 1 | ++ | | ++(+) | +++ | | | |
| Example 2 | — | — | ++ | +++ | | | |
| Example 3 | ++ | — | — | ++(+) | +++ | | |
| Example 4 | ++1) | 0 | ++ | +++ | | | |
| Example 5 | + | — | ++ | +++ | | | |
| Example 6 | + | — | ++ | +++ | | | |
| Example 7 | see Example 1 | 0 | +++ | | | | |
| Example 8 | n.d. | 0 | +++ | | | | |
| Comparative example 1 | + | — | — | — | +++ | | |
| Comparative example 2 | + | — | — | — | ++(+) | +++ | |

1)The transparency was evaluated on glass substrates
Legend:
+++ complete degradation
++(+) almost complete degradation
++ markedly visible degradation
+ visible degradation
0 slight change
— no change
n.d. not determinable To examine the catalytic activity towards foods, 1 drop of oil was dripped onto the coated substrates and subsequently fired in or carbonized in a baking oven with top heat and bottom heat for 30 min at 230° C. Examination of the cleaning action subsequently proceeded by tempering the samples for 1 h or 2 h in the oven at 300° C., 400° C. and 500° C. with subsequent visual evaluation.

The test (Table 2) shows significant advantages compared with the uncoated reference. A marked cleaning may be observed even after 400° C./1 h, and after 2 h the samples are clean. The coating according to the invention therefore enables, for example, the temperatures of pyrolysis ovens to be lowered by 100° C. in order to obtain the previous cleaning action. In this application, therefore, a significant energy fraction can be saved.

A further means of determining the catalytic action is the conversion of CO to $CO_2$. To this end, a reactant stream of 1% CO and 0.5% $O_2$ in helium was passed with a gas flow rate in the reactant of 183.3 ml/min through 125 mg of glass powder coated with the example 1 coating solution. In the course of this, the temperature of the sample chamber was increased gradually to 500° C. During the measurement, the $CO_2$ concentration was measured in the gas exit stream and was evaluated as a measure for the percentage conversion of the CO. It was found that the light-off temperature at which 50% of the CO had been converted to $CO_2$ was 300° C.

TABLE 2

CHARACTERISTICS OF THE COATING - OIL DEGRADATION (CARBONIZED)

| Substance | Transparency | Catalytic activity 400° C./1 h | Catalytic activity 400° C./2 h | Catalytic activity 500° C./1 h | Catalytic activity 500° C./2 h |
|---|---|---|---|---|---|
| Reference Borofloat | | — | — | ++ | +++ |
| Example 1 | ++ | ++ | +++ | | |
| Example 3 | ++ | ++ | +++ | | |

While the invention has been illustrated and described as embodied in a thermocatalytically active coating, a substrate which has a thermocatalytically active coating at least in parts, and also a process for producing a thermocatalytically active substrate surface and use thereof, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A coated substrate comprising a substrate and a thermocatalytically active coating, wherein said thermocatalytically active coating is applied to at least a part of the substrate and consists of a sol-gel layer and a catalytically effective amount of at least one lithium compound with catalytic activity for oxidation embedded in the sol-gel layer in an amount equivalent to not less than 2% by weight of lithium ions, based on total coating weight;

wherein said at least one lithium compound is selected from the group consisting of lithium halides, lithium phosphate, lithium nitrate, lithium sulfate, lithium acetate, lithium propionate, lithium citrate tetrahydrate and lithium derivatives of carboxylic acids; and wherein said sol-gel layer comprises a network of at least one oxide ingredient selected from the group consisting of silicon oxide, germanium oxide, titanium oxide, zirconium oxide, aluminum oxide, cerium oxide, boron oxide, iron oxide and tin oxide.

2. The coated substrate as defined in claim 1, wherein said substrate consists of a material selected from the group consisting of glass, glass ceramic, sintered glass, sintered glass ceramic, ceramic, sintered ceramic, metal, plastics and enamel.

3. The coated substrate as defined in claim 1, wherein said substrate has planar surfaces or said substrate consists of three-dimensional shaped bodies or of particles.

4. The coated substrate as defined in claim 1, wherein the substrate and the coating are colorless and/or transparent.

5. The coated substrate as defined in claim 1, further comprising a barrier layer arranged between the substrate and the thermocatalytically active coating.

6. The coated substrate as defined in claim 5, wherein the substrate, the barrier layer, and the coating are each colorless and/or transparent.

7. The coated substrate as defined in claim 1, further comprising an IR radiation-reflecting layer arranged between the substrate and thermocatalytically active coating.

8. The coated substrate as defined in claim 7, wherein the substrate, the IR-reflecting layer, and the coating are each colorless and/or transparent.

9. A process of making a coated substrate as defined in claim 1, wherein said process comprises the steps of:

a) providing a liquid to viscous coating composition;

b) applying the coating composition to the substrate; and c) after the applying of the coating composition to the substrate, drying the substrate to form the coated substrate.

10. The process as defined in claim 9, wherein the coated substrate is dried at a temperature of from 20° C. to 750° C.

11. The process as defined in claim 10, wherein said temperature is from 20° C. to 500° C.

12. A heating system, a cooking device, a deep-fat fryer, a microwave appliance, a baking sheet, a baking mold, a mesh baking grid, a grilling spit, an industrial automated baking machine, a steam extractor hood, a solar power system, a reactor, a combustion system, each of which contains a respective coated substrate as claimed in claim 1.

13. A thermocatalytic coating for catalytic oxidation, said thermocatalytic coating consisting of a sol-gel layer and a catalytically effective amount of at least one lithium compound with catalytic activity for oxidation embedded in the sol-gel layer;

wherein said catalytically effective amount is equivalent to not less than 2% by weight of lithium ions, based on total coating weight;

wherein said sol-gel layer comprises a network of at least one oxide ingredient selected from the group consisting of silicon oxide, germanium oxide, titanium oxide, zirconium oxide, aluminum oxide, cerium oxide, boron oxide, iron oxide and tin oxide; and wherein said at least one lithium compound is selected from the group consisting of lithium halides, lithium phosphate, lithium nitrate, lithium sulfate, lithium acetate, lithium propionate, lithium citrate tetrahydrate and lithium derivatives of carboxylic acids.

14. The thermocatalytic coating as defined in claim 13, wherein said at least one oxide ingredient is said silicon oxide, said zirconium oxide, or said aluminum oxide.

15. The thermocatalytic coating as defined in claim 13, wherein said at least one oxide ingredient is said zirconium oxide or said aluminum oxide.

16. The thermocatalytic coating as defined in claim 13, wherein said at least one lithium compound is lithium chloride, said lithium nitrate, said lithium sulfate or said lithium acetate.

17. The thermocatalytic coating as defined in claim 13, having a thickness of from 1 nm to 10 μm and which is colorless and/or transparent.

18. The thermocatalytic coating as defined in claim 13, in the form of a paste or liquid that contains a thickener selected from the group consisting of xanthan gum, glycerol, poly (ethylene glycol), poly(vinyl alcohol), polyvinyl-pyrrolidone, cellulose, cellulose derivatives and mixtures thereof.

19. The thermocatalytic coating as defined in claim 13, containing nanoparticles.

20. A thermocatalytic coating for catalytic oxidation, said thermocatalytic coating consisting of an inorganic matrix and a catalytically effective amount of at least one lithium compound with catalytic activity for oxidation, said at least one lithium compound being incorporated in said inorganic matrix;

wherein said inorganic matrix is a glass, glass solder or sol-gel matrix;

wherein said inorganic matrix contains, in addition to said at least one lithium compound, at least one oxide ingredient selected from the group consisting of silicon oxide, titanium oxide, zirconium oxide, aluminum oxide, cerium oxide, iron oxide, tin oxide and boroxidic material;

wherein said catalytically effective amount of said at least one lithium compound is equivalent to not less than 2% by weight of lithium ions, based on total coating weight; and wherein said at least one lithium compound is selected from the group consisting of lithium halides, lithium phosphate, lithium nitrate, lithium sulfate, lithium acetate, lithium propionate, lithium citrate tetrahydrate and lithium derivatives of carboxylic acids.

21. The thermocatalytic coating as defined in claim 20, wherein said at least one oxide ingredient is said silicon oxide, said zirconium oxide, or said aluminum oxide.

22. The thermocatalytic coating as defined in claim 20, wherein said at least one lithium compound is lithium chloride, said lithium nitrate, said lithium sulfate or said lithium acetate.

23. The thermocatalytic coating as defined in claim 20, having a thickness of from 1 nm to 10 μm and which is colorless and/or transparent.

24. The thermocatalytic coating as defined in claim 20, wherein said inorganic matrix is said sol-gel matrix, and in the form of a paste or liquid that contains a thickener selected from the group consisting of xanthan gum, glycerol, polyethylene glycol), polyvinyl alcohol), polyvinylpyrrolidone, cellulose, cellulose derivatives and mixtures thereof.

* * * * *